Oct. 15, 1935.   G. G. LINN   2,017,346
LEVELING ROD
Filed March 22, 1934   2 Sheets-Sheet 1

Inventor
George G. Linn

Attorney

Oct. 15, 1935.
G. G. LINN
2,017,346
LEVELING ROD
Filed March 22, 1934
2 Sheets-Sheet 2
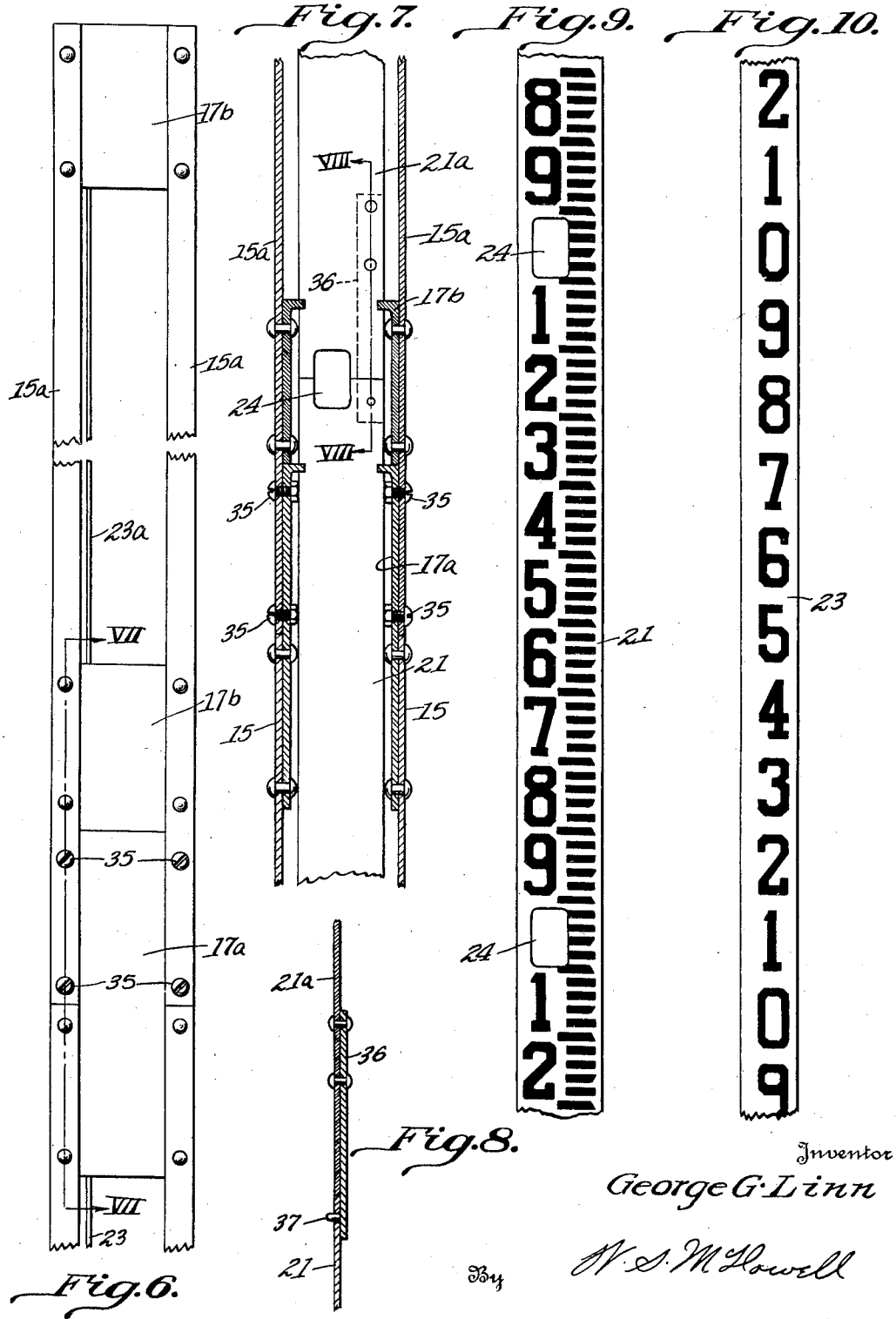

Patented Oct. 15, 1935

2,017,346

UNITED STATES PATENT OFFICE 2,017,346

LEVELING ROD

George G. Linn, Columbus, Ohio

Application March 22, 1934, Serial No. 716,825

7 Claims. (Cl. 33—74)

This invention relates to improvements in leveling rods of the general type employed by engineers or surveyors for determining elevations, and it is an object of the invention to provide a leveling rod of the direct reading type which comprises two rigid graduated slide members mounted for relative movement in a light weight frame, the construction being such that the slide members may be relatively adjusted to obtain directly and without computation various desired readings.

Rods of this character are used by engineers in connection with a leveling instrument to determine elevations, grades, plotting contours and sections, in the setting of grade stakes and in other capacities and it is a further object of the invention to provide an improved rod which may be easily and quickly adjusted to accurately disclose the actual elevations at points upon which the rod is held and which may be formed from one or more sections so as to possess desired length or height.

A still further object resides in the provision of a direct reading leveling rod which in use eliminates all work of reducing engineers' level notes and avoids the necessity for the use of three columns in the engineers' field books, namely, plus readings, height of instrument and minus readings.

Surveying instruments and engineering methods have been advanced to a high degree of efficiency during recent years. Leveling rods have been improved to be accurate, easily read, built of substantial materials, light weight and with graduations to resist weathering and usage. In fact, the better leveling rods now on the market are all that could be desired except for one important factor.

This exception can be illustrated best by a description of how the ordinary rod is used in leveling operations. Such a rod is graduated from the bottom upward. To secure the elevation of any point, a reading is taken on the rod by means of the leveling instrument with the rod held in a vertical position on a point of known elevation. This reading is added to the elevation of the point of known elevation, which gives the height of the instrument. The rod may now be held on any point of unknown elevation and the reading obtained may be subtracted from the height of the instrument to secure the elevation of this point. In like manner, the reading of every other point must be subtracted from the height of the instrument to secure its elevation.

It will be seen from the above that two calculations are necessary before any unknown elevation is obtained and that one calculation is required for each additional elevation obtained. It is also necessary to start the calculations all over again whenever the location of the leveling instrument is changed. My improved direct reading type of leveling rod eliminates all of these calculations, while retaining the essential advantages of rods in popular use at the present time.

In accordance with the present invention, my improved type of direct reading rod consists of two light weight slide members with equidistantly spaced windows in the front slide member and with graduations reading downwardly, said slide members being so arranged and constructed that by slight adjustment thereof, any desired reading may be secured at the line of sight from the leveling instrument. Further, the slide members are held in place by a light weight frame composed of one or more sections, which may be extended as desired. Then, in the use of the rod, I first set the slide members to disclose the correct elevation at the line of sight of the leveling instrument on any point of known elevation, and the reading taken on any other point with respect to said line of sight will be the actual elevation of such other point or points, the values of which may be determined at a glance and without calculation.

With these and other objects in view, which will appear as the description proceeds, the invention consists in the novel features of construction, combination of elements and arrangements of parts hereinafter fully described and pointed out in the appended claims.

In the accompanying drawings:

Fig. 6 is a side elevation of the leveling rod when a superposed complemental section is employed in connection therewith;

Fig. 7 is a vertical sectional view on the line

Figures 1, 2, 3, 4, 5:
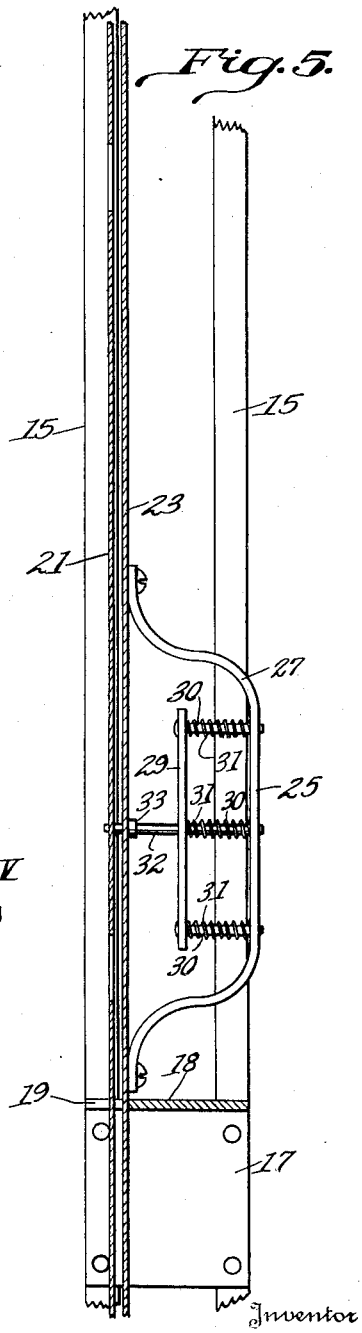
Fig. 1 is a perspective view of a leveling rod constructed in accordance with the present invention.
Fig. 2 is a horizontal sectional view on the plane indicated by the line II—II of Fig. 1.
Fig. 3 is a similar view on the plane disclosed by the line III—III of Fig. 1.
Fig. 4 is a detailed vertical sectional view through the clamping means for the front slide member, the plane of the figure being indicated by the line IV—IV of Fig. 3.
Fig. 5 is a vertical sectional view on the line V—V of Fig. 1, and disclosing the means for retaining the front and rear slide members in fixed relationship.

VII—VII of Fig. 6 disclosing the detachable securing means for uniting a plurality of rod sections in assembled relationship;

Fig. 8 is a detail vertical sectional view on the line VIII—VIII of Fig. 7 and disclosing the means for connecting a pair of vertically aligned front slide members;

Fig. 9 is a view in front elevation of a portion of the length of the front slide member;

Fig. 10 is a similar view of the rear slide member.

Referring more particularly to the structural details of the specific embodiment of my improved leveling rod therein illustrated, I provide a light weight metallic frame formed preferably from aluminum alloy. The frame comprises four longitudinally extending relatively spaced corner bars or angles as indicated at 15, to the lower ends of which is riveted or otherwise secured a U-shaped base bracket 16, while corresponding inverted U-shaped brackets 17 are suitably secured to the bars 15 at spaced points throughout the length of the latter so that a rigid frame, substantially rectangular in cross section, is provided, but one which is quite light in weight and not substantially heavier than standard types of leveling rods.

The forward edges of the horizontally disposed plates 18 of the brackets 17 are recessed as indicated at 19 and these recessed portions are provided with registering notches 20 formed for the sliding reception of a front slide member 21, which is preferably in the form of a thin metallic strip or bar. The recesses 19 are of such form as to provide a backing for the slide member 21 and terminate in additional notches 22 disposed for the sliding reception of a rear slide member 23. This latter member is arranged contiguous to but immediately to the rear of the front slide member 21, being preferably formed from the same materials and possessing a slightly narrower width than the front slide member, as illustrated more particularly in Figs. 2 and 3.

The front slide member has its outer surface preferably etched with arithmetical graduations to one hundredth parts of a foot, tenth numerals from 1 to 9 progressing downwardly in arithmetical order and with windows or openings 24, spaced one foot apart, through which the foot numerals, etched on the front surface of the rear slide member 23 may be observed. The rear slide member has foot numerals 1, 2, etc. to 9, 0, spaced one and one-third inches apart. It has been stated that the U brackets or braces 17 have their front edges slotted to act as guides for these slide members. A manually operated spring locking device 25, hereinafter more fully described, is attached to the rear slide member and may be employed to simultaneously raise or lower said slide members or to provide for independent adjustment thereof, to enable the engineer to read the correct tenths and hundredths on the front slide member. When this is accomplished, the front slide member is then clamped frictionally in a desired operating position within the frame by means of the clamping screw 26, disclosed more particularly in Figs. 3 and 4. The locking device may then be disengaged from association with the front slide member and the rear slide member moved up or down through increments of travel of one and one-third inches to show the proper foot numerals through the windows 24 of the front slide member, provision being made at the top of the main section of the leveling rod to associate additionally higher sections therewith if necessary. Preferably, the numerals appearing on the front slide section are of different coloration from the numerals appearing on the rear slide section.

In the use of the rod, the base bracket 16 is placed on a bench marker or other point of known elevation, the set screw 26 is loosened, and the handle 27 of the locking device is grasped so that both slide members may be adjusted vertically in unison within the frame in order that the tenth and hundredth graduations appearing on the outer surface of the front slide member 21 may be brought into proper and desired registration with the line of sight of the surveyor's leveling instrument (not shown). When this adjustment has been obtained, the set screw 26 is tightened to retain the front slide member in its adjusted position. This is accomplished by the provision of a bearing plate 28 supported in connection with one of the brackets 17 and which is engaged on one side by the threaded end of the set screw 26 so that when the latter is tightened, the other side of the plate 28 will be forced into firm frictional engagement with one of the vertical edges of the front slide member 21, thus binding the latter in its guides 20 against vertical displacement.

Then, to adjust the rear slide member 23 so that the proper foot numerals thereon will be viewable through the windows 24 in accordance with the surveyor's line of sight and the known point of elevation, the said handle 27 carries in connection therewith a cross bar 29 formed with a plurality of parallel pins 30 which extend through openings in the handle 27, springs 31 being positioned between the cross bar 29 and the handle 27 and disposed around the pins 30 so that the normal tendency of said springs will be to force the bar 29 forwardly. The forward portion of the bar 29 is provided with a stud 32 formed with a stop collar 33 normally adapted to engage with the rear surface of the slide member 23. The stud projects in advance of the collar 33 and is received within an opening provided in the rear slide member and in any one of a plurality of spaced vertically aligned and registering openings 34 formed in the front slide member 21.

Thus, if the point of known elevation may be said to be 8.8 feet, the rod is adjusted so that its graduated slide members will be so disposed in registration with the line of sight of the leveling instrument whereby the numeral 8 on the rear slide member 23 will be disposed in alignment with one of the windows 24 of the front slide member, and the front slide member, in turn, will be adjusted vertically in the frame of the rod so that the numeral 8 immediately below said window, will be disposed in exact registration with the line of sight of the leveling instrument. The rod may then be placed at different positions of elevation, but so long as the line of sight of the leveling instrument is maintained, the variations in the elevations may be conveniently read in a direct manner on the leveling rod without further adjustment of the slide members of the latter or by resort to mental calculations.

In the event it is desired to extend the height or length of the rod, I provide, as shown in Figs. 6 and 7, a supplemental frame corresponding in construction to the frame of the main or lower section. The main frame and the supplemental superposed section may be united by detachably connecting the lower ends of the bars 15a of the supplemental frame with the U-shaped bracket 17a provided at the top of the main or lower section. This attachment may be effected through the employment of screws or the like 35. The bars 15a of the supplemental frame are provided with the transverse connecting brackets 17b, which are grooved or recessed to receive the slide members 21a and 23a. The adjoining ends of said slide members may be readily connected, as disclosed in Fig. 8, by providing the upper slide members 21a and 23a with spring tongues 36, the latter being provided at their free ends with pins 37 which enter openings formed in the upper portions of the slide members 21 and 23, thereby providing a secure but readily removable connection between the adjoining ends of the vertically aligned upper and lower sets of slide members.

By this sectional construction of the leveling rod, the effective height of the latter may be increased in accordance with the working conditions encountered, and so far as I am aware, the leveling rod comprising the present invention is the first direct reading type of rod wherein provision is made for such sectional assembly. I am aware of the fact that it has been proposed heretofore to employ direct reading types of leveling rods, but such earlier constructions have proved impractical for various reasons. Thus in earlier types of such rods, it has been proposed to employ a foot indicating rear member in the form of an endless tape containing foot graduations, but in such earlier types it has been difficult to maintain registration between the front and rear sets of graduations and virtually impossible to provide for sectional assembly of the rod to obtain variation in the height thereof. In accordance with the present invention, all parts are of rigid construction which readily maintain their adjustment and withstand the severe usage to which instruments of this character are placed when in service.

It will be understood that variations may be made in the above construction without departing from the spirit of the invention as the latter has been expressed in the following claims.

What is claimed is:

1. A leveling rod comprising a frame, a front slide bar extending vertically of said frame, guides carried by said frame in which said bar is vertically adjustable, said slide bar being provided with spaced apertures and having its front surface graduated, means for maintaining said bar in its various positions of vertical adjustment within said guides, and a second substantially rigid slide bar adjustably carried in the guides of said frame and disposed parallel and immediately to the rear of said front slide bar, the second slide bar being provided with numerals indicating feet disposed in registration with the apertures in the front slide bar.

2. A leveling rod comprising a frame, a substantially rigid front slide member mounted in said frame for vertical adjustment, said member being provided with openings uniformly spaced apart the definite distance of an accepted unit of measurement and containing on its front face graduations constituting fractional parts of said unit of measurement, a second substantially rigid slide member vertically adjustable in said frame and disposed to the rear of the first slide member, said second slide member being provided with numerals indicating units of measurement viewable through the openings provided in the front slide member, means for retaining said front slide member in its various positions of vertical adjustment in said frame, and means carried by said rear slide member admitting of adjustment of said rear slide member independently of the front slide member and for retaining said rear slide member in its various positions of vertical adjustment.

3. A leveling rod comprising a frame composed of longitudinally extending bars and transverse connecting brackets, the forward portions of said brackets being recessed to provide pairs of spaced guides, a front slide member extending longitudinally of said frame and received within the forward guides of said brackets for adjustment vertically of said frame, clamping means carried by said frame for retaining said front slide member in fixed positions of adjustment, a second rigid slide member positioned in the other guides of said brackets for adjustment vertically of said frame, said second slide member being located immediately to the rear and parallel with the front slide member, and means carried by the rear slide member and cooperative with the front slide member for effecting adjustment of said slide members in unison and independent adjustment of the rear slide member and its retention in desired positions of adjustment relative to the front slide member.

4. A leveling rod comprising a frame, a front bar slidably carried by said frame, said front bar having on one side a sub-scale and provided with openings spaced equidistantly in accordance with an accepted unit of measurement, a second slide bar adjustable vertically of said frame to the rear of the front slide bar, said second slide bar containing numbers arranged in arithmetical progression and showing through the openings in the front slide bar, and means providing for independent vertical adjustment of said slide bars and their fixed retention in their relative positions of adjustment within said frame.

5. A leveling rod comprising a plurality of separable longitudinally aligned frames, connecting means between the adjoining ends of said frames, longitudinally adjustable front and rear slide bars carried by said frames, separable connections between the adjoining ends of the slide bars of said frames, and means carried by said frames for maintaining said slide bars in their various positions of relative adjustment within said frames, said front slide bars being provided with openings through which numerals appearing on the rear slide bars are viewable.

6. A leveling rod comprising a frame, a front slide bar adjustable longitudinally of said frame in stationary guides carried by said frame, a rear slide bar extending parallel to and immediately to the rear of said front slide bar and adjustably mounted in said guides, and a spring pressed plunger carried by the rear slide bar and arranged to be received within registering openings formed in said slide bars.

7. A leveling rod comprising a plurality of separable longitudinally aligned frames, connecting means between the adjoining ends of said frames, front and rear guides formed in said frames, a plurality of longitudinally adjustable substantially rigid slide bars positioned in each of said guides, flat leaf spring strips rigidly carried by certain of the slide bars in each of said guides, said strips being arranged to overlie the ends of the adjoining strips, and a pin carried by the overlying end of each of said strips, said pins being positioned in openings formed in the ends of the adjoining bars to unite adjoining bars for sliding movement together.

GEORGE G. LINN.